United States Patent [19]

Taylor

[11] Patent Number: 5,215,267
[45] Date of Patent: Jun. 1, 1993

[54] COMPOSTER

[75] Inventor: Laurie A. Taylor, St. Louis, Mo.

[73] Assignee: Master Garden Products, Inc., St. Charles, Mo.

[21] Appl. No.: 672,480

[22] Filed: Mar. 20, 1991

[51] Int. Cl.$^5$ .................. C05F 17/02; C05F 9/02
[52] U.S. Cl. .................. 241/101.8; 241/199.2; 241/DIG. 38
[58] Field of Search ............ 241/199.2, 199.7, 199.12, 241/101 B, DIG. 38; 71/9, 10, 14

[56]  References Cited

U.S. PATENT DOCUMENTS

| | | | |
|---|---|---|---|
| 2,680,069 | 6/1954 | Eweson | 71/9 |
| 3,015,188 | 1/1962 | Reinecker et al. | 47/9 |
| 3,234,691 | 2/1966 | Cowell et al. | 47/9 |
| 3,387,827 | 6/1968 | Carlyon | 259/36 |
| 3,527,278 | 9/1970 | Johnson | 146/124 |
| 3,712,353 | 1/1973 | Ferry | 241/27 |
| 3,728,254 | 4/1973 | Carothers | 210/7 |
| 3,823,879 | 7/1974 | Johnson | 241/101.2 |
| 3,837,810 | 9/1974 | Richards et al. | 23/259.1 |
| 3,890,129 | 6/1975 | Chester | 71/9 |
| 3,960,537 | 6/1976 | Kaelin | 71/9 |
| 3,998,037 | 12/1976 | Deans et al. | 56/295 |
| 4,067,140 | 1/1978 | Thomas | 47/9 |
| 4,105,412 | 8/1978 | Petzinger | 23/259.1 |
| 4,108,609 | 8/1978 | Petzinger | 23/259.1 |
| 4,203,755 | 5/1980 | Ruckstuhl | 71/9 |
| 4,633,535 | 1/1987 | Louvo | 4/449 |
| 4,683,674 | 8/1987 | Faul | 47/83 |
| 4,912,917 | 4/1990 | du Moulin | 56/16.9 |
| 5,024,770 | 6/1991 | Boyd et al. | 210/747 |

FOREIGN PATENT DOCUMENTS 3718990  5/1988  Fed. Rep. of Germany .......... 71/14

OTHER PUBLICATIONS

Webster-Kirkwood Times (Jan. 17–23, 1992) page numbers unknown.
St. Louis Post Dispatch (Oct. 24, 1991) article "Time To Panic".
"National Gardening" Magazine (Sep./Oct. 1991) pp. 38, 39, 69.
"Mother Earth News" (Aug./Sep. 1991) pp. 49–53.
"Resource Recycling Journal" (Aug. 1991) pp. 22–32).
"Consumers Reports" Magazine (Jun., 1991) pp. 414–418.
"Do It Yourself Retailing" Magazine (Jun., 1991) p. 99.
"Gardener's Eden" Magazine (Spring, 1991) p. 23.
"Garbage" Journal (Mar./Apr., 1991) p. 65.
"Don't Bag It" (Feb., 1991), Univ. Extension/Univ. of Missouri, Columbia.
"Resource Recycling" Recycling Journal (Dec., 1990) cover page.
"Garbage" Journal (Sep./Oct. 1990) Green Magic Tombler Adv.
"Biocycle" Journal (Aug., 1990) p. 16.
"Biocycle" Journal (Aug., 1990) pp. 54–59.
"Biocycle" Journal (Aug. 1990) pp. 60–62.
"Biocycle" Journal (Apr., 1990) pp. 42–46.
"Biocycle" Journal (Jul., 1988) pp. 36–42.
"Biocycle" Journal (Mar., 1988) $109 Per Ton For Leaf Disposal & Regional Roundup.
"Flower & Garden" Magazine (No Date) Composting Easier Than Ever, (Date Unknown) pp. 66, 68, 70, 74.

Primary Examiner—Mark Rosenbaum
Assistant Examiner—John M. Husar
Attorney, Agent, or Firm—Heller & Kepler

[57]  ABSTRACT

A composter for composting organic yard and household debris, has an enclosure, a feed opening, a discharge opening, an internal breaking and mixing assembly. The enclosure is made of durable red cedar and a bottom member can be a perforated fiberglass with moisture collection valleys and perforations to drain excess moisture.

16 Claims, 6 Drawing Sheets

COMPOSTER

BACKGROUND OF THE INVENTION

The present invention relates in general to organic debris composting and pertains, more particularly, to a composter directed to the composting of organic yard and household debris. The composter of this invention is an improvement over the conventional stationary and tumbling organic debris composters.

With the conventional composter it is generally necessary to provide a plurality of organic debris bins and physically transfer the debris from bin to bin as decomposition takes place, fill a bin and tumble it periodically, or filling a bin and periodically inserting a generally elongated tool into the bin and stirring the contents. These conventional composters are constructed out of material that does not weather well or is open enough to attract vermin and unwanted insects.

Another drawback associated with the conventional composter is the difficulty associated with mixing the debris as it decomposes, since it is understood that organic debris composting is primarily an aerobic process and while it is desirable to obtain an elevated core temperature it is not desirable to use all of the available oxygen adjacent the core, thereby starving and killing the bacteria so important to an efficient composting process. Existing composters do not provide all of the requirements found in the present invention.

Accordingly, it is an object of the present invention to provide an improved composter that is adapted for weather resistance and a substantially long useful life.

Another object of the present invention is to provide an improved composter that is constructed to provide an above ground rotating composter. The rotating construction promotes adequate decomposition by maintaining sufficient oxygen supply for the desired decomposition process.

A further object of the present invention is to provide a composter that has a substantially rot-proof construction and provides rot-proof drainage of the organic material in the composter.

Still another object of the present invention is to provide a composter that has a combination roof and lid that provides access into the composter, sheds excess moisture, and generally promotes heat retention for faster composting.

Still a further object of the present invention is to provide an improved composter that includes a larger front opening for easy compost retrieval. The composter of this invention is characterized by large openings at top and bottom to facilitate loading and unloading.

Another object of the present invention is to provide a composter that builds good soil texture through the use of leaves, lawn trimmings, and acceptable organic material, all of which is highly beneficial to soil quality. The composter of this invention enriches and lightens clay soil, increases soil's capability to hold moisture without producing unpleasant odors or attracting unwanted pests.

SUMMARY OF THE INVENTION

To accomplish the foregoing and other objects of this invention there is provided a composter for composting organic debris. The composter comprises means for containing an amount of organic debris with the addition of any conventional activators necessary for efficient decomposition of the organic debris and provides for rotation of the composter container.

As the container rotates a mixing and breaking member facilitates the breaking of larger pieces into smaller pieces with an increase in surface area and a corresponding increase in the aerobic activity of decomposition as oxygen is allowed to interact with a greater amount of the debris. Rotation is accomplished by supporting the container on a generally raised support structure and extending the breaking and mixing member into the support members to also facilitate the rotation.

An internal debris support member is formed with one or more valleys for collecting excess moisture which drains through holes generally located in the valleys or other low spots provided.

Access is provided in the top for loading the composter and in a side member for removing the composted soil.

The composter of the present invention is preferably adapted for aesthetic outside use and also provides a fully functional composter. In the disclosed embodiment described herein, there are provided a fiberglass bottom member that will not rot while continuing to give the desired drainage for excess moisture within the composter. A lid also serves as a functional roof to further shed unwanted excess moisture from within the composter.

Also, in the preferred embodiment the construction materials are cedar and pvc which should provide a composter with an extended useful life.

These and other objects and features of the present invention will be better understood and appreciated from the following detailed description on one embodiment thereof, selected for purpose of illustration and shown in the accompanying drawings.

DETAILED DESCRIPTION

Figure 1:
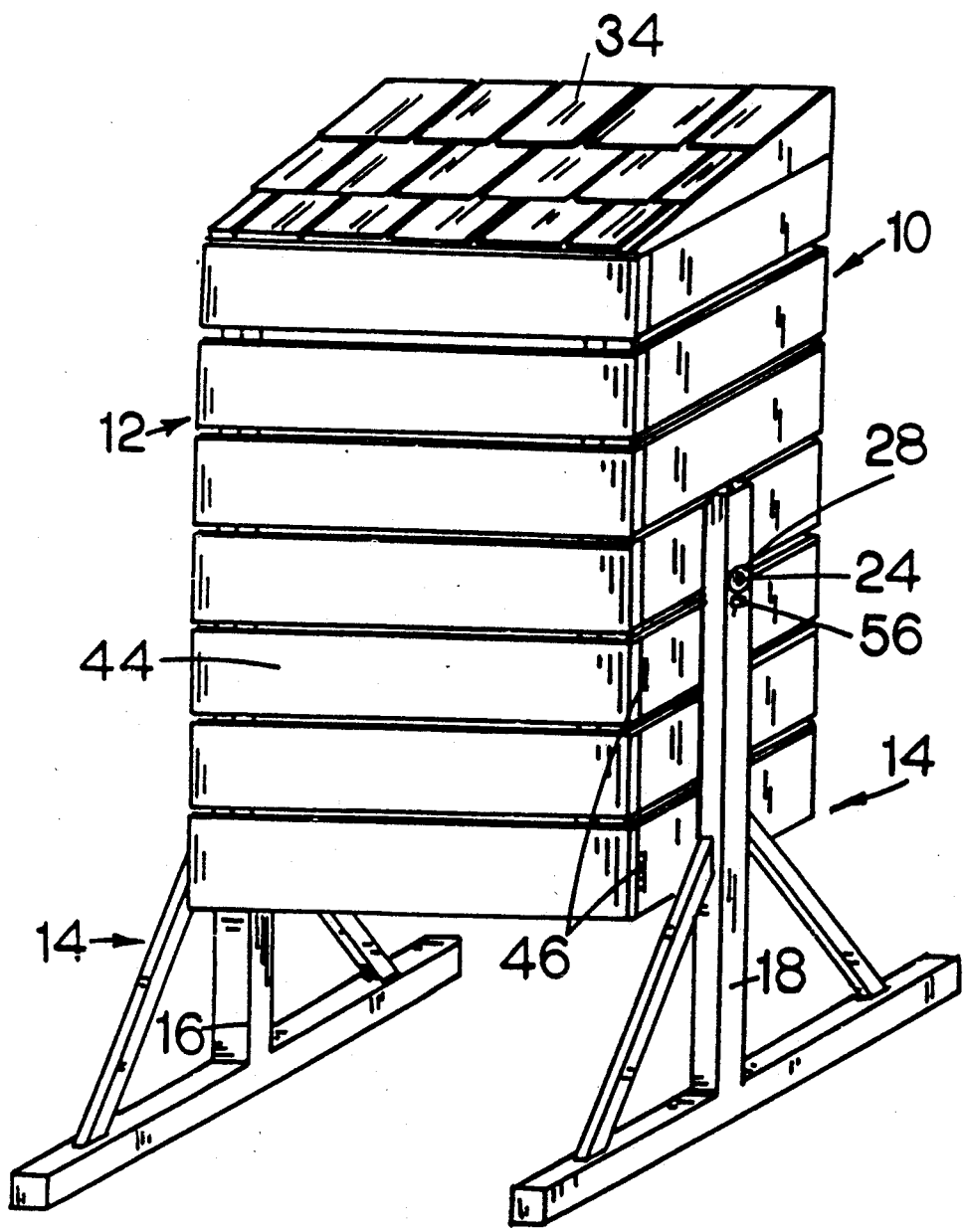
FIG. 1 is a perspective view of a composter constructed in accordance with the present invention.
Figure 2:
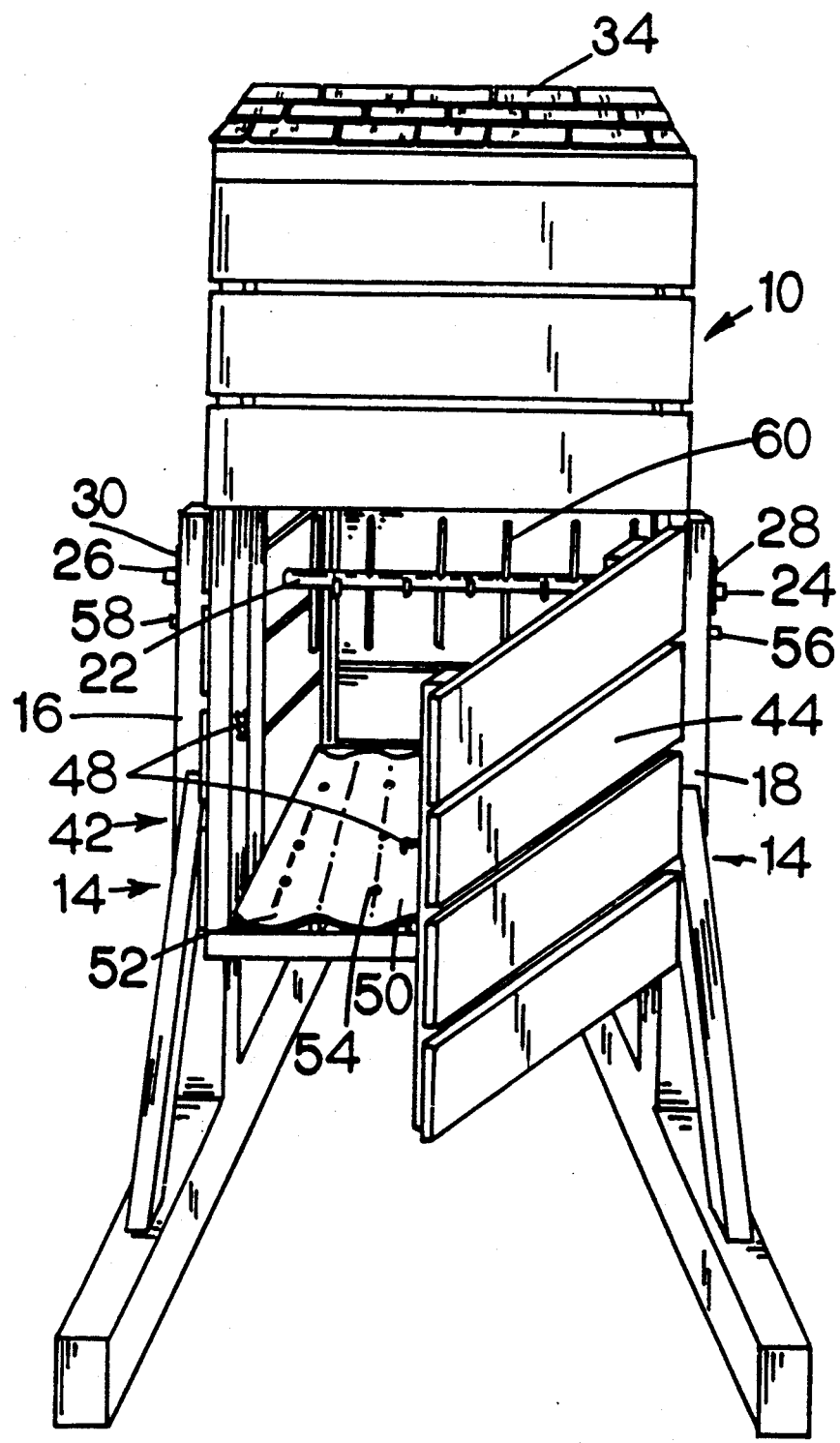
FIG. 2 is a front view of the composter depicted in FIG. 1.
Figure 3:
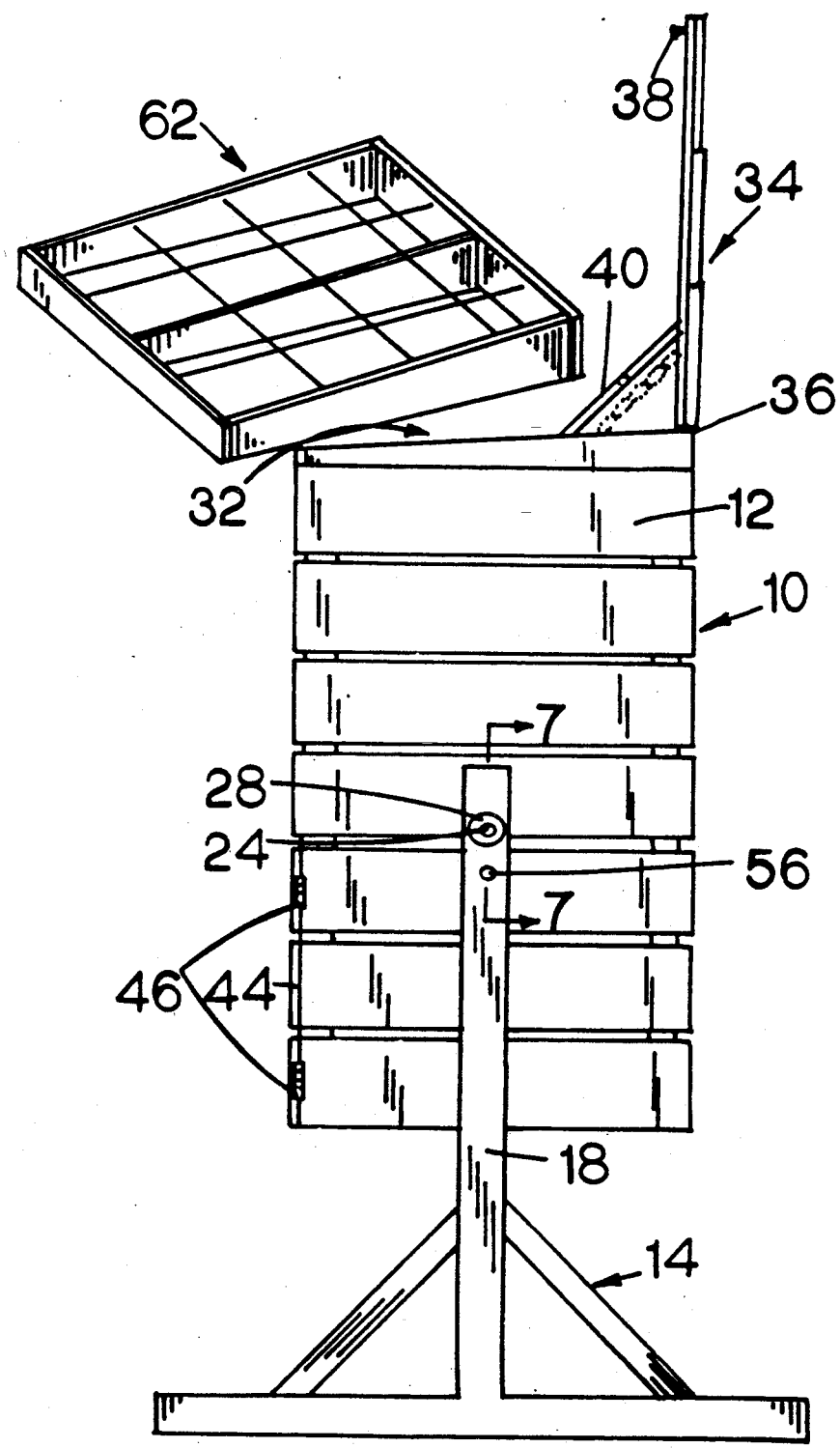
FIG. 3 is a side view of the composter depicted in FIG. 1.
Figure 4:
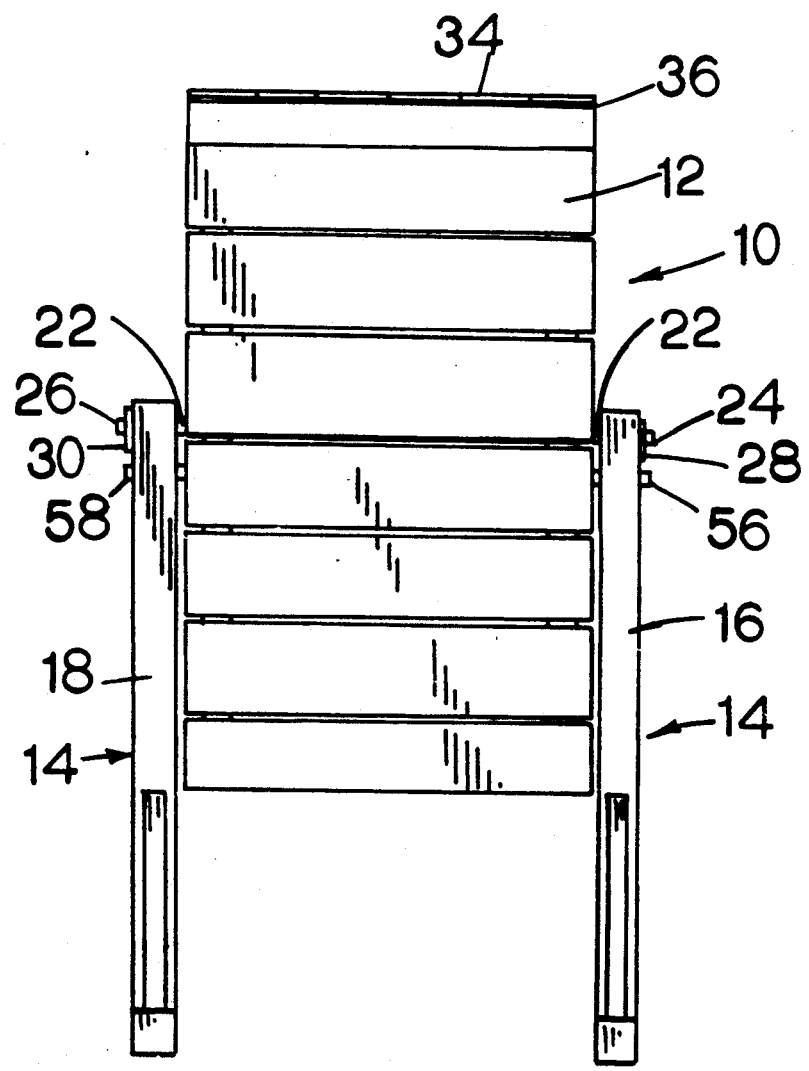
FIG. 4 is a rear elevation.
Figure 5:
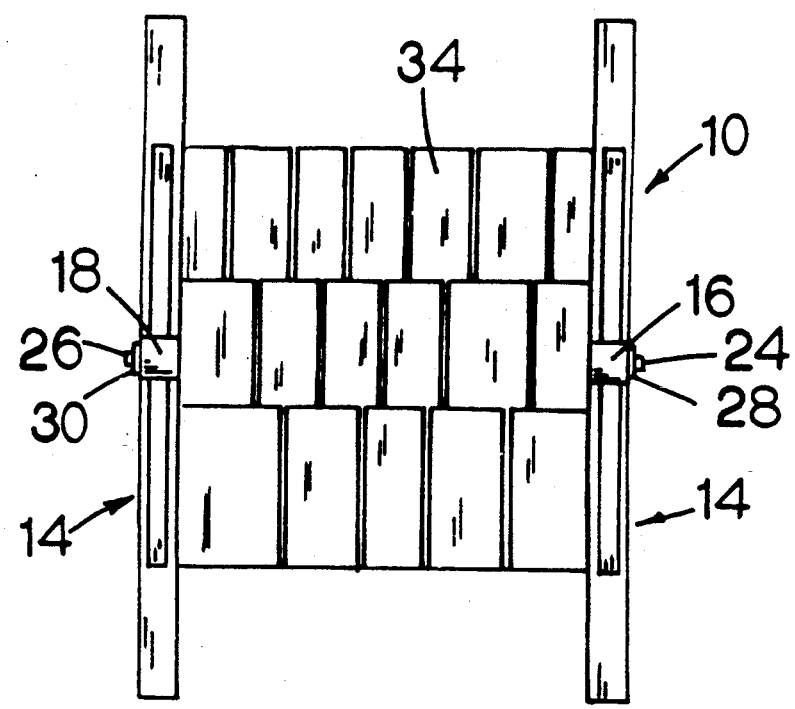
FIG. 5 is a top view.
Figure 6:
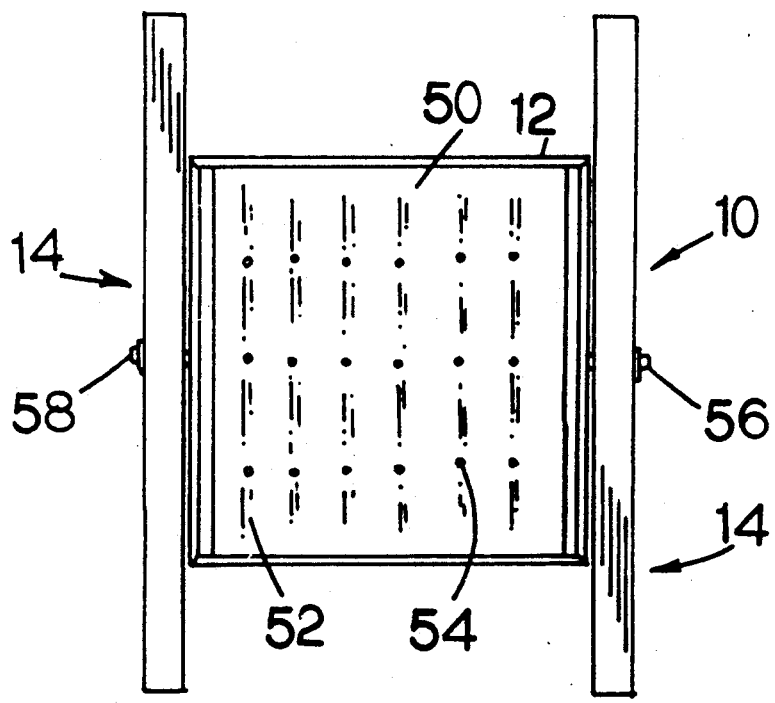
FIG. 6 is a bottom view.
Figure 7:
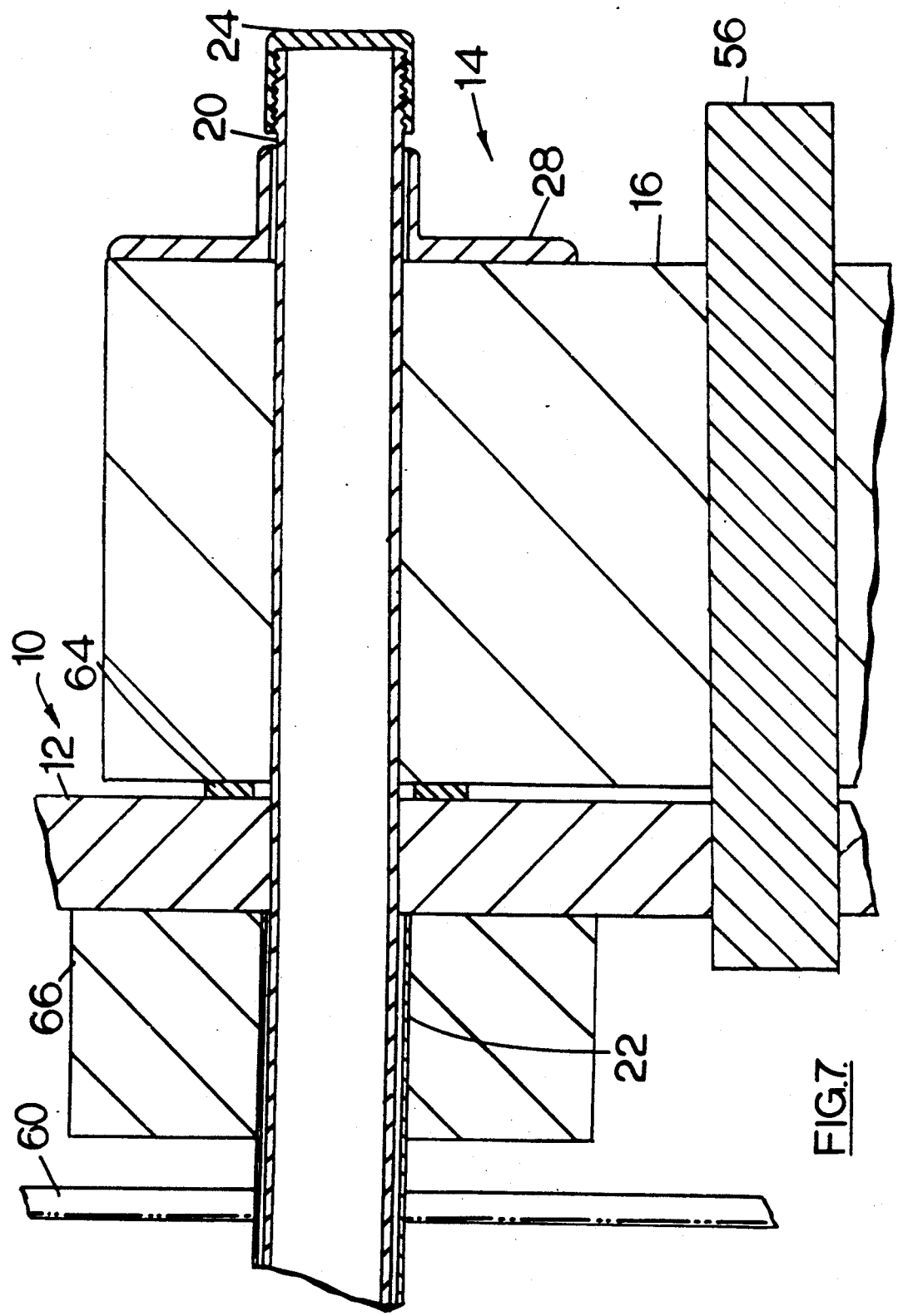
FIG. 7 is a cross-sectional view taken along line 7—7 in FIG. 3.

Referring now to the drawings there is shown a preferred embodiment for the composter of this invention. The composter is described in connection with a yard and household debris application to compost yard and household debris such as grass clippings, egg shells, old plants and cut flowers, leaves, straw, weeds, algae, and small amounts of wood ashes, coffee grounds, shredded newspaper, sawdust, and wood chips.

The drawings show the yard debris composter 10 including a means for containing the debris and the subsequent compost. A composting enclosure 12 is generally supported by composting enclosure support members 14 which comprise one side support 16 and another side support 18 in a preferred embodiment illustrated in the drawings and described herein.

A means for breaking up the debris and then further breaking the debris and mixing the debris and compost combination is provided. The drawings illustrate a rotation and breaker/mixing shaft 20 generally within a rotation shaft sleeve 22.

This shaft assembly is supported by the composting enclosure support members 14 in the following fashion in a preferred embodiment. The shaft 20 is seen to extend through the side supports 16, 18 and terminate in one rotation shaft end member 24 and another rotation shaft end member 26 which may be caps threaded onto the threaded ends of a length of conduit used for the shaft 20.

The end members cooperate with a rotation shaft end flange 28 and another rotation shaft end flange 30. These end members allow the shaft to rotate while maintaining the shaft between the flanges. The end caps act to close the conduit and prevent the interior of the conduit to be used by unwanted pests.

Generous means are provided for feeding the enclosure with the debris to be composted. A composting enclosure feed opening 32 is provided as well as an associated closure means and roof combination. A lid and roof (when closed) 34 provides access and also sheds excess water to further the composting process. In a preferred embodiment, the lid includes one or more hinge members 36, a latch 38 to keep the lid closed during rotation of the enclosure, and a suitable lid limiting member such as a chain or pivoted member 40.

Similarly, generous means are provided for removing or discharging the compost by having a discharge opening 42 and a closure or door 44. Again, the door will include suitable hinge members 46 and latch 48 that allow the door to be kept closed as the enclosure is rotated.

An important feature of the present invention is the rot-proof bottom closure means that allows decomposition, further assists to retain heat, and allows for the drainage of excess moisture. This is accomplished in a preferred embodiment by providing a bottom member 50 that includes or defines drainage valleys 52 and/or other suitable low points.

In a preferred embodiment the valleys contain one or more drainage perforations 54 that allow the water to drain onto the ground. It will be noted that the raised structure keeps the excess moisture away from the compost enclosure. Thus, the composter is raised up from ground moisture and the ground underneath can be prepared to quickly drain or funnel away the moisture.

In operation, in connection with the yard and household debris composter application previously mentioned these debris are fed into the composting enclosure 12 where an optional feed opening screen 62 may be situated to screen out large organic and non-organic material that would impede the desired compost process.

As the debris is fed into the enclosure 12 it is further broken up by the shaft 20 and sleeve assembly 22. In one preferred embodiment, the assembly 20, 22 includes one or more projections or teeth 60 that further breaks up the debris. It will be understood that the assembly does not require the teeth 60 to function as desired, although they may be desirable.

The composter 10 is preferably located close to a water supply and in a level area before filled with a variety of organic material as previously listed. Moisture is added to keep the debris moist. As is well understood, it is desirable to maintain the debris, initially and as it composts, moist but not wet (e.g., comparable to a wet sponge).

The enclosure 12 is periodically rotated as the center of the compost matter reaches its peak core temperature, generally indicating a peak of aerobic decomposition. The enclosure is easy to rotate as the shaft 20 readily rotates within the sleeve 22.

The user will understand the necessity to obtain a peak core temperature and what the core temperature peak might be given the location and the weather, as it is well known that warm weather will compost organic material at a faster rate. The combination of rotating the enclosure and mixing the compost and debris with the assembly 20, with or without teeth/projections, supplies the oxygen necessary for the bacteria and microbes to decompose the material.

Prior to rotation the doors are secured and the stop pegs 58 and 56 are slid out of place and the enclosure is slowly rotated. When rotation is complete the pegs are replaced to stop the enclosure and stabilize the enclosure in an upright position. It is believed (although subject to field testing and verification) that adequate compost can be produced in approximately four (4) weeks in a 31.5 cubic foot capacity composter and high grade compost produced in approximately another four (4) weeks.

In a preferred embodiment it is known that an optimum carbon/nitrogen balance can be obtained by adding high nitrogen producing matter (e.g., fertilizer, commercial manure, bone meal, fresh grass clippings, coffee grounds) with high carboniferous material (e.g., straw, corncobs, sawdust, old weeds). An ammonia odor generally signals that the nitrogen level is too high. The importance of maintaining a balanced pH is also understood as is the neutralization of high acid matter (e.g., oak leaves, pine needles) with limestone.

From the foregoing description those skilled in the art will appreciate that all of the objects of the present invention are realized. A composter has been shown and described for providing an improved composter adapted for weather resistance and a substantially long useful life through the use of materials such as cedar and pvc and raising the composter up off the ground. The rotating construction promotes adequate decomposition by maintaining sufficient oxygen supply for the desired decomposition process.

Excess moisture is kept out or removed by use of the roof/lid and the drainage provided in the bottom member and heat is better retained than might otherwise occur. The larger front opening allows easy compost retrieval.

While a specific embodiment has been shown and described, many variations are possible. The particular shape of the enclosure and the supports including all horizontal and vertical dimensions may be changed as desired to suit the application. The housing materials may vary although red cedar, fiberglass bottom to promote heat retention, and pvc sleeves to facilitate shaft rotation are preferred.

In one preferred embodiment the support members are 4'×4's, the angled members are 2×4's and the side members are all generally 2'×6' s. The configuration shows a slight rake to the roof and this could be varied without significantly altering the function and look of the composter.

The feed opening screen 62 can be supported by nailers attached to the inside of the enclosure. However, it will be understood that the screen is not a necessity but could be a desired option.

Having described the invention in detail, those skilled in the art will appreciate that modifications may be made of the invention without departing from its spirit. Therefore, it is not intended that the scope of the invention be limited to the specific embodiment illustrated and described. Rather, it is intended that the scope of this invention be determined by the appended claims and their equivalences.

What is claimed is:

1. An organic debris composter for providing an environment conducive to the decomposition of the organic material, comprising:
    means for containing an amount of organic debris and any additional activators necessary for efficient decomposition of the organic debris, the containing means includes a top member than opens for access to the interior of the containing means and intended for normal deposit or addition of material to be composted to the interior of the containing means, and another access opening generally intended for removal or the composted material, the other access opening separate from the top member, the containing means having a plurality of sidewalls and the other access opening located in one sidewall member, the sidewalls constructed to allow air flow through the containing means suitable for the composting process to occur;
    means for raising the containing means above the ground;
    rotation means for supporting the containing means, the rotation means supported by the raising means;
    means for breaking and mixing the contents of the containing means as the containing means rotates about the rotation means, the breaking means including a member extending substantially between opposing sidewalls of the containing means; and
    means for draining moisture from the interior of the containing means, the draining means located in an opposing wall member of the containing means relative to the top member, the draining means being constructed of a substantially rot-proof material, the draining means having at least one low point with draining means for collection and removal of moisture.

2. A composter as set forth in claim 1 wherein the containing means is a weather resistant enclosure.

3. A composter as set forth in claim 1 wherein the rotation means is a shaft extending through the containing means and the shaft forms the means for breaking and mixing the contents of the containing means both as the contents are deposited in the containing means and as the containing means rotates.

4. A composter as set forth in claim 3 wherein the breaking and mixing means further comprises one or more projections extending outward from the shaft extending through the containing means.

5. A composter as set forth in claim 1 wherein the rotation means comprises:
    a shaft extending through the interior of the containing means; and
    a pair of opposing side support members located outside of the containing means and receiving an end of the shaft and allowing the shaft to rotate relative to the respective side support.

6. A composter as set forth in claim 5 wherein the rotation means further includes a sleeve receiving the shaft and each end support receiving an end of the sleeve and the shaft rotates within the sleeve.

7. A composter as set forth in claim 6 wherein the sleeve includes one or more outwardly extending projections for breaking and mixing the contents of the containing means as the containing means is rotated and as the containing means is filled.

8. An organic debris composter for providing an environment conducive to the decomposition of the organic material, comprising:
    a composting enclosure, the composing enclosure including a sloped top member that opens for filling and adding organic debris for composting and any additives necessary for efficient decomposition of the organic debris and an opening for removing the compost product;
    composting enclosure support members for supporting the composting enclosure above the ground and for rotation relative to the composting enclosure support members;
    a shaft assembly intermediate the support members and extending through the composting enclosure, the support members supporting the composting enclosure on the shaft for rotation of the composting enclosure about the shaft, the shaft assembly providing means for breaking and mixing the contents of the composting enclosure as the contents are added and as the composting enclosure rotates;
    a substantially rot-proof bottom member, the bottom member defining one or more valleys for collecting excess moisture, the bottom member defining one or more holes providing gravity drainage of excess moisture from the composting enclosure; and
    an access door located in the composting enclosure and readily accessible when the sloped opening is rotated to the top and the bottom member is rotated to the bottom.

9. A composter as set forth in claim 8 wherein the composting enclosure support members include one side support member and another side support member on the opposite side of the composting enclosure.

10. A composter as set forth in claim 8 wherein the shaft assembly comprises:
    a shaft member extending from one support member to the other support member and supporting the composting enclosure on the support members;
    a sleeve receiving the shaft member, the sleeve received by the respective support members and fixed to the support members for rotation of the shaft member within the sleeve.

11. A composter as set forth in claim 8 wherein the feed opening receives a screen and the screen is covered by a lid.

12. A composter as set forth in claim 11 wherein the lid forms a roof to shed rain and excess moisture from the composting enclosure and to thereby shelter the contents from excess moisture which tends to decrease the efficiency of decomposition.

13. A composter as set forth in claim 8 wherein the compost product removal opening includes a door normally closed during rotation of the composting enclosure and normally open when discharging or removing compost from the composting enclosure.

14. A composter as set forth in claim 8 further comprising means for impending rotation.

15. A composter as set forth in claim 14 wherein the rotation impeding means comprises a peg inserted through the composting enclosure support member and a portion of the composting enclosure to maintain the composting enclosure in a fixed position.

16. A composter as set forth in claim 1 wherein a feed opening screen fits within the composting enclosure deposit opening to screen out large organic material and non-organic material.

* * * * *